C. M. STAUFFER.
Device for Teaching Music.
No. 203,210. Patented April 30, 1878.
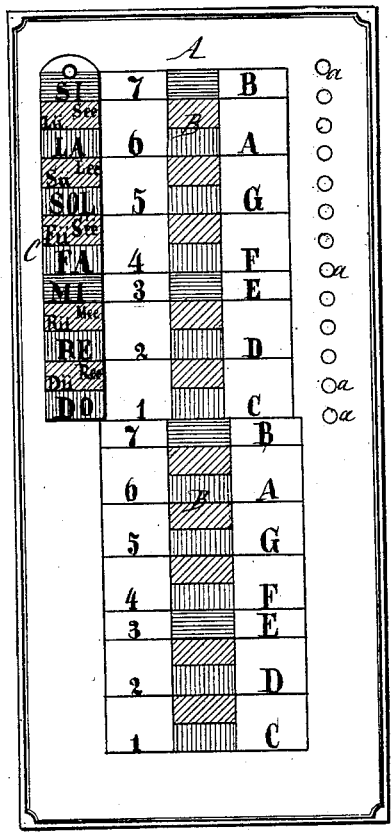
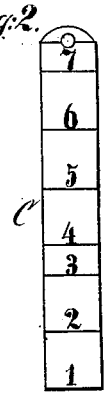
Witnesses:
Inventor
Chr. M. Stauffer
per Ernst Bilhuber
his Attorney

UNITED STATES PATENT OFFICE.

CHRISTIAN M. STAUFFER, OF BERNE, INDIANA.

IMPROVEMENT IN DEVICES FOR TEACHING MUSIC.

Specification forming part of Letters Patent No. 203,210, dated April 30, 1878; application filed February 25, 1878.

*To all whom it may concern:*

Be it known that I, CHRISTIAN M. STAUFFER, of Berne, in the county of Adams and State of Indiana, have invented a new and useful Improvement in Devices for Teaching Music, of which the following is a specification:

This invention consists in the combination of a board showing on its surface two scales of notes, one above the other, with an adjustable tablet, which is divided to correspond with the scales of notes on the board.

In the accompanying drawing, in which similar letters of reference indicate like parts, Figure 1 is a face view of my device, and Fig. 2 is a separate view of the adjustable tablet.

The letter A designates the board, which is laterally divided into fourteen spaces, said spaces being subdivided, so as to represent the keys B of a piano or other similar instrument. At the right-hand side of these keys are letters, while on the left-hand side are placed numerals generally used to indicate the notes. In this example two scales, one above the other, are shown in the natural key. The squares representing the keys are distinguished by different colors, in such a manner that the red squares represent the lower or white keys of a piano or other keyed instrument, the blue squares represent the keys for the half intervals, E and B, and the green color indicates the upper or black keys of a piano or other similar instrument.

The tablet C is also divided on one side into seven spaces, marked with numerals 1, 2, 3, 4, 5, 6, and 7, from the lower end upward. These spaces correspond in size with the spaces on the board. The other side of the tablet is also divided into seven spaces, which are subdivided to correspond in size and color with the subdivisions on the board, representing the keys of a piano or other similar instrument. Said spaces are marked with the syllables do, re, mi, fa, sol, la, si, and dii, ree, rii, mii, &c. This tablet is provided with a pin projecting on both sides of the same, for the purpose of inserting the same into holes *a*, provided for its reception, in the board A.

In using my apparatus, I begin with the key of C major, and place the tablet in such position that the syllable do on the tablet comes opposite the numeral 1 or letter C. It is obvious that by this arrangement re comes to stand opposite D, mi opposite E, and so on in the same manner as on the staff.

To illustrate the transposition from C major to G major, and to find the key-note, I place the tablet in such position that the syllable do comes opposite to the letter G, and re opposite the letter A, and so on. In this manner the different keys are plainly illustrated, and the position of the key-note impressed upon the mind of the scholar. Further, it will be observed that, by my apparatus, the tuning-fork may, in most cases, be dispensed with, as the sound of the key-note can be easily found.

The teacher will find my apparatus equally efficient, whether he uses the letters, syllables, or numerals to designate the notes.

What I claim is—

In a device for teaching music, a board containing two scales of musical notes, said notes being indicated by letters and numerals opposite differently-colored squares, in combination with a tablet bearing on one side numbers corresponding with those shown on the board, and on its other surface syllables do, re, mi, fa, sol, la, si, and provided with a pin which projects on both sides, said pin fitting into holes provided for its reception in the board, combined and arranged to operate substantially as described and shown.

CHR. M. STAUFFER.

Witnesses:
JOHN SCHURGER,
ISAAK LEHMANN.